(No Model.)
P. H. HILLARD.
TOY.
No. 481,948. Patented Sept. 6, 1892.
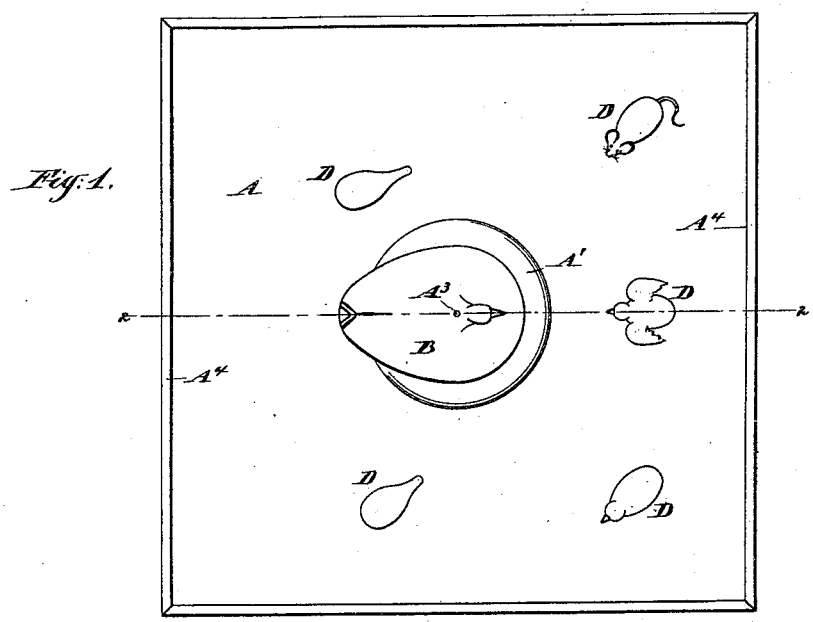
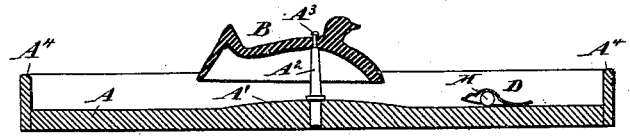
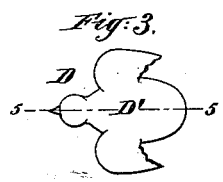
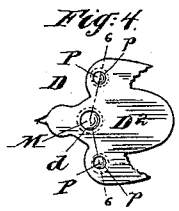
Witnesses:
Charles R. Searle,
H. A. Johnstone.
Inventor:
Paul H. Hillard
by his attorneys
Thomas Drew Stetson

UNITED STATES PATENT OFFICE.

PAUL H. HILLARD, OF STONINGTON, CONNECTICUT.

TOY.

SPECIFICATION forming part of Letters Patent No. 481,948, dated September 6, 1892.

Application filed March 5, 1892. Serial No. 423,832. (No model.)

*To all whom it may concern:*

Be it known that I, PAUL H. HILLARD, a citizen of the United States, residing at Stonington, New London county, in the State of Connecticut, (post-office address Westerly, Rhode Island,) have invented a certain new and Improved Toy, of which the following is a specification.

I prepare a small structure which may to promote the effect be in the form of a fish or animal, colored or printed, as desired, and equip it with an inclosed spherical support, as a shot, allowed to protrude sufficiently through a hole in the bottom to bear on the floor or supporting-surface below, which latter should be movable as a game-board. The interior of the structure being made smooth, and as far as practicable frictionless, as by rubbing liberally with black-lead, and one part of the device—the hinder part when it represents an animal or fish—being allowed to drag on the floor and induce more friction at that point than at other points, the device may be made not only to move in different directions as the support is moved by concussion or is inclined, so that gravity may act, but also to turn itself partially around at each change of direction, imitating the action of a living creature, as a bird, animal, or fish. In what I esteem the most complete form of the invention I provide more than one shot or corresponding spherical carrier arranged so that one of true form will carry most of the weight and others of slightly irregular contour may be made to support a portion and impart a peculiar wriggling motion.

One use of the invention is to serve in a game in which a number of my devices shall be placed on a board, the board being worked by the successive players to collect the several devices under a shelter in the center or at other point, which may be, for example, in the form of a mother bird, turning easily on a pivot and being held at sufficient height to allow the movable devices to be collected under it.

The accompanying drawings form a part of this specification, and represent what I consider the best means of carrying out the invention.

Figure 1 is a plan view. Fig. 2 is a section on the line 2 2 in Fig. 1. The remaining figures show portions on a larger scale. Fig. 3 is a plan or top view. Fig. 4 is a corresponding view from below. Fig. 5 is a vertical section on the line 5 5 in Fig. 3. Fig. 6 is a vertical section on the line 6 6 in Fig. 4. Fig. 7 is a vertical section showing a modification. Fig. 8 is a corresponding section on a larger scale, and Fig. 9 is a corresponding section showing the single central ball spheroidal.

Similar letters of reference indicate corresponding parts in all the figures where they appear.

A is the movable board, the upper surface of which is mainly plane, but with a portion near the center slightly domed, as indicated by A'. In the center of this domed portion is a post $A^2$, on the top of which is a smaller pin $A^3$. On this is pivoted a device B, resting on an offset at the upper end of the stout post $A^2$ and kept in position by the thinner portion or pin $A^3$. This may be in the form of a mother bird. The board should have a raised margin $A^4$.

I will designate each of my movable devices by the letter D, using super-numerals to designate special parts of each, D' being the top and $D^2$ the bottom. I have in my experiments made the top of well-sized muslin with a lining of paper, the latter liberally coated on its under face with black-lead. This upper portion may be rounded like a turtle-back. The bottom may be plane. The top and bottom may be secured permanently all around by glue. There is a circular hole $d$ in the bottom $D^2$. The height of the top D' above the bottom $D^2$ is important and should be carefully determined and permanently maintained.

M is a spherical ball or shot inclosed within the device over the central hole and allowed to protrude downward through it to bear on the floor A and form the main support for the device. This ball is set sufficiently forward of the center of gravity of the device to allow the hinder portion $D^3$ to bear by its gravity on the board A and induce sufficient friction to promptly turn the device so soon as the direction of its motion is changed in any case. The device should always move with the same point or side foremost. In case it is made to imitate a bird, fish, or animal, the point which moves forward should be the head. There should be greater friction between the ball M and the floor A than between it and the inner surface of the top D'. I have discovered that it is practicable to thus mount the device and have so little friction between the shot M and the top and also so little friction between the shot and the margin of the hole in the bottom in which it rolls that it will turn freely in all directions and allow the device to be supported by a rolling contact of this spherical support on the floor A. On each side of the main central support M is a smaller shot P, which is only approximately round. Each bears nearly frictionless against the inner face of the top, which part may be something lower at this point. Each protrudes through a hole $p$ in the bottom and is capable of rolling with its slightly-irregular form on the support A. The parts are so proportioned that only one of the side balls P will bear at any given time. The tendency of the irregular form is to oscillate the structure on the central spherical support M and cause the side balls to bear alternately, giving a peculiar wriggling effect to the motion as the device is traversed in various directions on the board A. It may be made to traverse either by quick movements, concussions imparted to the board, or by slightly tilting the board or by dexterously combining these modes of imparting and controlling motion. The rims or edges of the holes $d$ may be specially touched with black-lead to reduce the friction.

Modifications may be made without departing from the principle or sacrificing the advantages of the invention. I can obviously vary the number of the movable devices D. Their forms may be varied. The shelter B in the center can have various forms. What I have termed "shot" may be made of any material which will conform to the conditions. I can use balls of glass or marble. I can use accurately-finished steel balls. I use the word "balls" to refer to either spheres or spheroids.

The surface $D^3$, which makes a friction on the board A, may be coated with rubber cement to increase the frictional quality; but I believe such coating to be not generally necessary or useful.

Parts of the invention may be omitted. I can omit the balls P. I can make the central ball of irregular form, so that a wabbling or wriggling motion will be imparted as the device travels on it.

The swell A' in the board A and the shelter B and its support may be dispensed with. A perfectly-plane board or plate of glass may serve for the support A. Figs. 7 and 8 show such a modification with the central ball M spherical, and Fig. 9 shows the same spheroidal.

I claim as my invention—

1. A toy device having a hollow shell with a ball inclosed and protruding through the base adapted to support the shell by rolling on a surface below and to allow it to move easily in all directions, as herein specified.

2. A toy device having a hollow shell with a ball inclosed and protruding through the base adapted to support the shell by rolling on a surface below and allowing it to move easily in all directions and having a surface $D^3$ in its base allowed to bear frictionally on the floor or surface below and to effect the turning of the device axially with each change in the direction of its motion, as herein specified.

3. A toy device composed of a hollow shell with its interior prepared to offer but slight friction and inclosing one or more spheroids allowed to protrude through the bottom, so as to impart a wriggling motion as it moves by the rolling of such support or supports on a surface below, as herein specified.

4. The board A, with its dome A', central post $A^2$, pin $A^3$, and rim $A^4$, in combination with a set of movable devices composed each of a hollow shell with a spheroid inclosed and protruding through the base adapted to support the shell by rolling on a surface below and allowing it to move easily in all directions and having a surface $D^3$ in its base allowed to bear frictionally on the floor or surface below and to effect the turning of the device axially with each change in the direction of its motion, as herein specified.

In testimony that I claim the invention above set forth I affix my signature in presence of two witnesses.

PAUL H. HILLARD.

Witnesses:
W. H. CRANDALL,
ALPHEUS E. ELDRED.